(12) United States Patent
Nassar

(10) Patent No.: US 7,636,324 B2
(45) Date of Patent: Dec. 22, 2009

(54) SYSTEM AND METHOD FOR AUTOMATED PROVISIONING OF INTER-PROVIDER INTERNET PROTOCOL TELECOMMUNICATION SERVICES

(76) Inventor: Ayman Esam Nassar, 6020 Countless Stars Run, Clarksville, MD (US) 21029

( * ) Notice: Subject to any disclaimer, the term of this patent is extended or adjusted under 35 U.S.C. 154(b) by 919 days.

(21) Appl. No.: 10/785,233

(22) Filed: Feb. 24, 2004

(65) Prior Publication Data

US 2004/0165605 A1    Aug. 26, 2004

Related U.S. Application Data

(60) Provisional application No. 60/449,697, filed on Feb. 25, 2003.

(51) Int. Cl.
*H04L 12/28* (2006.01)
(52) U.S. Cl. .................. 370/254; 370/351; 370/389; 709/225; 709/244
(58) Field of Classification Search ............ 370/254, 370/351, 216, 217, 218, 219, 220, 221, 222, 370/223, 224, 225, 226, 401, 389; 709/225, 709/228, 229, 238, 244, 245
See application file for complete search history.

(56) References Cited

U.S. PATENT DOCUMENTS

| | | | |
|---|---|---|---|
| 5,550,816 A | | 8/1996 | Hardwick et al. |
| 5,960,004 A | * | 9/1999 | Ramstrom et al. ........... 370/469 |
| 6,434,612 B1 | | 8/2002 | Hughes et al. |
| 6,728,777 B1 | | 4/2004 | Lee et al. |
| 6,753,887 B2 | | 6/2004 | Carolan et al. |
| 6,839,424 B1 | * | 1/2005 | Burnett ................. 379/265.02 |
| 6,950,847 B2 | * | 9/2005 | Harrisville-Wolff et al. . 709/201 |
| 7,050,423 B2 | | 5/2006 | Schneider et al. |
| 7,065,072 B1 | | 6/2006 | Quiles et al. |
| 7,079,485 B1 | | 7/2006 | Lau et al. |
| 7,096,502 B1 | * | 8/2006 | Fox et al. ....................... 726/25 |
| 7,246,159 B2 | * | 7/2007 | Aggarwal et al. ............ 709/220 |
| 7,346,771 B2 | * | 3/2008 | Narayanan .................. 370/216 |
| 2002/0198815 A1 | * | 12/2002 | Greifeld et al. ............... 705/37 |
| 2003/0028451 A1 | * | 2/2003 | Ananian ....................... 705/27 |
| 2003/0142811 A1 | | 7/2003 | Teixeira |
| 2003/0144935 A1 | * | 7/2003 | Sobek .......................... 705/35 |
| 2003/0172170 A1 | | 9/2003 | Johnson et al. |

(Continued)

OTHER PUBLICATIONS

Gleeson, B., et al.; "A Framework for IP Based Virtual Private Networks"; http://www/ietf.org/rfc/rfc2764.txt!number=2764; Network Working Group, pp. 1-58.

(Continued)

*Primary Examiner*—Pankaj Kumar
*Assistant Examiner*—Lonnie Sweet
(74) *Attorney, Agent, or Firm*—Garlick Harrison & Markison; Holly L. Rudnick

(57) ABSTRACT

An automated system and method to request, process, fulfill, manage and terminate an inter-provider IP service is introduced to allow the realization of an electronic inter-provider IP service, including the service definition, requisition, contracting, provisioning, management, fulfillment and settlement. The system includes an adaptive hardware infrastructure and flexible software to define business models and revenue structures that can adapt to business requirements and provide real-time information to profit centers.

17 Claims, 6 Drawing Sheets

U.S. PATENT DOCUMENTS

| | | | |
|---|---|---|---|
| 2003/0189936 A1 | 10/2003 | Terrell et al. | |
| 2004/0085912 A1* | 5/2004 | Xu et al. | 370/254 |
| 2006/0114889 A1 | 6/2006 | Schneider et al. | |
| 2007/0083528 A1 | 4/2007 | Matthews et al. | |

OTHER PUBLICATIONS

Bellman, B.; "Back to Reality"; Brook Trail Research, 2001, Brook Trail Research; pp. 1-6.

Rosen, E., et al.; "BGP/MPLS VPNs"; http://www.ietf.org/rfc/rfc2547.txt?number=2547; Network Working Group, pp. 1-24.

"Integrated Provider Edge (PE) Services Switch Maximizing the Value of Your BGP/MPLS VPN Deployment"; CoSine Communications; 26 pages.

"Passport IP-VPN Services"; Using Passport to build the profitable, high-performance Internet; Nortel Networks; Product/Service Information; 87013-16/01-01, Issue 2, Jan. 30, 2001; 27 pages.

"Redback Subscriber Management System Overview"; Redback Networks; Dec. 2001, pp. 1-17.

"Sun Enterprise 10000 Server: Dynamic System Domains"; Sun Microsystems; Feb. 1999; 24 pages.

Purna, K. M. G., et al.; "Temporal Partitioning and Scheduling Data Flow Graphs for Reconfigurable Computers"; IEEE Transactions on Computers, vol. 48, No. 6, Jun. 1999; pp. 579-590.

Munro, J.; "Virtual Machines & VMWARE, Part 1"; ExtremeTech—Print Article; http://www.extremetech.com/print_article/0,3428,a=20322,00.asp; pp. 1-20.

RSVP Protocol Overview (http://www.isi.edu/rsvp/overview.html) Jan. 19, 1998—per WayBack Machine.

* cited by examiner

SYSTEM AND METHOD FOR AUTOMATED PROVISIONING OF INTER-PROVIDER INTERNET PROTOCOL TELECOMMUNICATION SERVICES

CROSS-REFERENCE TO RELATED APPLICATIONS

This application claims the benefit of U.S. Provisional Application Ser. No. 60/449,697, filed Feb. 25, 2003. This application is also related by subject matter to co-pending U.S. patent application Ser. No. 10/667,869 filed Sep. 22, 2003.

BACKGROUND OF THE INVENTION

1. Technical Field of the Invention

The present invention relates generally to the field of telecommunications, and more specifically to the optimization and utilization of telecommunication resources between two or more different administrative domains to realize inter-provider Internet Protocol (IP) telecommunication services.

2. Description of Related Art

Service providers have been struggling to find means to reduce operational and capital expenses, and improve revenue streams. These challenges have been magnified by the explosive growth in Internet traffic resulting in an exponential demand for Internet Protocol (IP) networks and its services. This has put even more pressure on service providers to bring in additional revenue from their networks, reduce costs of operating the network and minimize capital expenses. Additionally, the fact that access services and backbone transit have emerged to become low-margin commodity services has compounded the problem even further.

In the past few years, there has been a growing demand and need for IP end user applications. Examples of these applications include e-commerce, instant messaging, voice chat, video conferencing, corporate virtual private networks, long-distance IP telephony, mobile email, web support centers and many others.

IP applications require two main ingredients to operate and function effectively. The first ingredient is network services that interoperate with IP applications and provide intelligence for the IP applications to utilize the transport layer of the network. Examples of network services are VPNs, policy routing, quality of service (QoS), dynamic network provisioning, customization, secured traffic, multicasting, network mobility, caching and availability. The second ingredient is an intelligent infrastructure that can be controlled by network services to yield the optimum and most efficient environment for IP applications to be realized and valued.

In today's business environment, IP applications are end-to-end, which means that these applications span multiple service providers. However, inter-provider services offered today do not offer end-to-end service quality guarantees. As IP service providers start offering new IP applications to their end subscribers and deploy IP service switches on the edge of their networks, the demand for inter-provider IP services becomes increasingly important. Lack of such inter-provider IP service guarantees reduces the value of the IP applications offered to end users.

In addition, provisioning inter-provider IP services is a cumbersome task and involves a huge amount of time and resources. It can easily take weeks and months to provision an end-to-end service spanning multiple providers. Since service provider networks are configured and built separate from one another, inter-provider IP services require custom business and technology transactions between all service providers involved. This requirement makes the process of supplying inter-provider IP services a cumbersome and time consuming process as one-to-one deals and configurations have to be developed. Furthermore, resource availability information is usually not available in real-time, and hence resources could be left unutilized.

Moreover, infrastructure nodes are typically static with no adaptive reconfigurable capabilities, which can prevent providers from exercising or implementing customized business and networking relations across their borders. For example, traditional Internet routers or switches currently do not allow providers to control inter-provider relations or to effectively provision services across their networks due to the lack of inter-provider management tools and lack of intelligence in the hardware to adapt and fulfill inter-provider business requirements.

At the same time, the fixed Internet business model, where customers pay a flat fee for access, has not proven to be successful and has resulted in poor reciprocal compensation models between service providers. Models currently in use do not reflect the value, quality, market demand, or priority of a service, nor do these models take into account the availability of network resources and the dynamic changes of the market. This static model has resulted in marginal profit margins (if any) and lack of true value to the end user.

It can be easily noted that the issues discussed above are factors that directly contribute to higher operating and capital costs. In addition, inefficient utilization of existing IP resources, such as routing information, capacity, quality of service, security and many other resources that could become huge and innovative sources of revenue also severely inhibits the growth of service providers. Furthermore, the legal, financial, technical, marketing and operational risks service providers have to deal with today are enormous and diverse.

What is needed is a system and method for provisioning IP services across service providers in a cost-effective and efficient manner. In addition, what is needed is a system and method for improving the quality of IP services provisioned across service providers, thereby increasing the value of end user IP applications. Furthermore, what is needed is a method and process for provisioning IP services across service providers to create new sources of revenue to service providers, while mitigating the risks to the service providers.

SUMMARY OF THE INVENTION

To overcome deficiencies of the prior art, embodiments of the present invention provide an automated system and method to request, process, fulfill, manage and terminate an inter-provider IP service. The method and system allow the realization of an electronic inter-provider IP service, including the service definition, requisition, contracting, provisioning, management, fulfillment and settlement. The system includes an adaptive hardware infrastructure and flexible software to define business models and revenue structures that can adapt to business requirements and provide on-the-fly information to profit centers.

In one embodiment, the system includes a first network associated with a first service provider and a second network associated with a second service provider. When a request for an inter-provider IP service is received, the real-time availability of the resources of the first network and the second network that are needed for the inter-provider IP service are determined, and the inter-provider IP service is automatically provisioned using the available resources.

In another embodiment, the availability of resources is advertised between the networks to maximize usage of resources and provide cost-efficient service to end users. The inter-provider IP service can be customized by the end user, and business contracts between service providers can be executed to provision the inter-provider IP service.

In one implementation embodiment of the invention, the adaptable hardware infrastructure is realized by a unified and integrated switch (UIS) that can be segmented into a number of logical communication nodes, each being associated with a different service provider and each being capable of being dynamically configured in a customized manner by the different service providers. The UIS further includes common resources, a portion of which can be dedicated to and configured by the different service providers or the administrator service provider. The flexible software is realized by a software engine (SE) that exchanges information with the UIS to manage and realize the inter-provider IP service.

Advantageously, embodiments of the present invention can reduce the costs associated with supplying inter-provider end-to-end IP services for an end customer IP application, and can improve the quality of inter-provider IP services by using real-time information on the availability and price of network and software resources. In addition, embodiments of the present invention can further increase the value of end user IP applications and allow service providers to realize new sources of revenue.

BRIEF DESCRIPTION OF THE DRAWINGS

The disclosed invention will be described with reference to the accompanying drawings, which show important sample implementation embodiments of the invention and which are incorporated in the specification hereof by reference, wherein.

DETAILED DESCRIPTION OF EMBODIMENTS OF THE INVENTION

Figure 1:
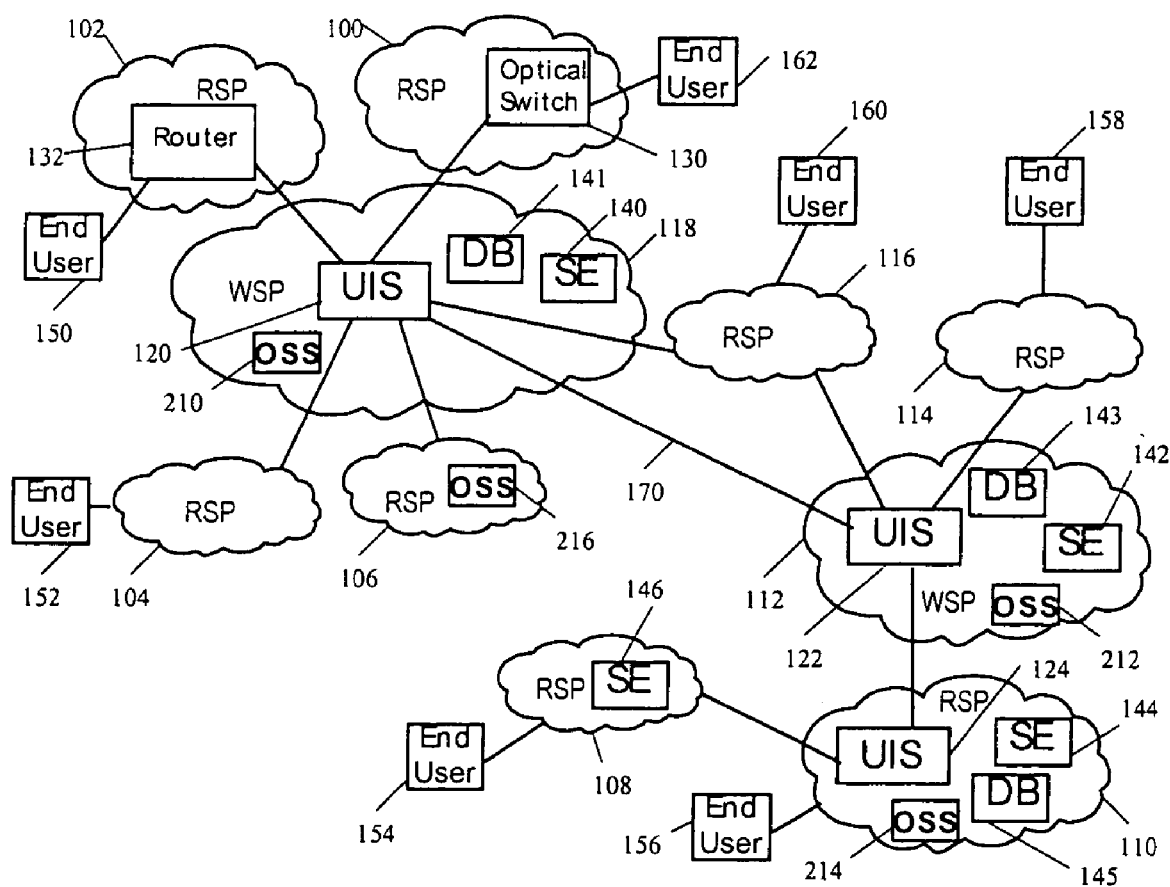
FIG. 1 illustrates an exemplary telecommunications network configuration capable of implementing inter-provider IP services, in accordance with embodiments of the present invention.

The following definitions are used in reference to the accompanying description:

RETAIL SERVICE PROVIDER (RSP) is a service provider that sells services to an end user. The end user could be an enterprise or a residential subscriber. Examples include, but are not limited to, local communication companies, Internet Service Providers (ISPs), phone companies, broadband providers, large enterprises, government agencies, content providers, and wireless providers.

WHOLESALE SERVICE PROVIDER (WSP) is a service provider that sells services to other providers. Examples include, but are not limited to, network service providers, Competitive Local Exchange Carriers (CLECs), Regional Bell Operating Companies (RBOCs), Public Telephone and Telegraph (PTTs), Clearing Houses (CH), Network Access Points (NAPs), Collocation centers, Telecom Hotels, Peering Points, Global Wireless Providers, Global Capacity Providers, Content Providers and wholesale division of retail service providers.

IP SERVICE is a network function that supports an end-user business requirement, by means of making the network function accessible to an IP application using standard protocols and interfaces. Examples of IP services include, but are not limited to, routing, virtual private networks (VPNs), traffic engineering (TE), policy based routing (PBR), quality of service (QoS), security (IPSec), tunneling, multicasting, network addressing and configuration, traffic forwarding and switching, mobility, network accounting, subscriber network configuration personalization, dynamic network provisioning, network caching and network availability. Examples of the standard protocols and interfaces that allow applications to utilize IP services include, but are not limited to, Session Initiation Protocol (SIP), Extensible Markup Language (XML), Hyper Text Transfer Protocol (HTTP), Common Open Policy Service (COPS), Lightweight Directory Access Protocol (LDAP) and, Simple Network Management Protocol (SNMP).

IP APPLICATIONS are end user applications that require the use of IP for operation. IP applications can be applications that use information, such as IP domain names, IP addresses or other IP network information or services for operation. Examples of IP applications include, but are not limited to, IP telephony, Storage Area Networks, Next generation voice networks, Instant messaging, IP Video conferencing, Unified Messaging, Personalization, Mobile Internet Access and Mobile Web Commerce.

IP RESOURCES are resources of an IP based telecom network. These resources could be tangible in the form of infrastructure resources. Examples of IP telecom resources include, but are not limited to, processors, computing cycles, queuing and scheduling processors, switching elements, physical input/output ports and interfaces, encryption engines, network capacity and other similar resources. Resources could also be intangible, such as routing information, utilization information, software licenses, logical channels, encryption software, firewall software and other similar resources available on an IP based network.

END USER is a subscriber to an IP application or service. Examples of end users include, but are not limited to, individuals, businesses, organizations, and other residential or commercial types of end users.

FIG. 1 illustrates an exemplary telecommunications network configuration capable of implementing an inter-provider IP service, in accordance with embodiments of the present invention. The inter-provider IP service provisioning process is realized through the use of various hardware and software components. For example, in the case of provider WSP 118, the components responsible for provisioning inter-provider IP services are a Unified and Integrated System (UIS) 120, a set of databases (DB) 141, a set of software engines (SE) 140 and an Operation and Support System (OSS) 210. Each of these components will be described separately below.

In the network configuration shown in FIG. 1, RSPs 100, 102, 104, 106 and 116 are interconnected to one another through WSP 118. RSPs 100, 102, 104, 106 and 116 connect their network infrastructure nodes to UIS 120 installed in the network of WSP 118. WSP 118 is also connected to other WSPs, such as WSP 112, through the use of high speed links 170 connecting UIS 120 to UIS 122. WSP 112 also has a number of RSPs 110, 114 and 116 interconnected through UIS 122. RSP 108 is connected to RSP 110. RSP 110 manages and operates UIS 124, which it shares with RSP 108. End users (150-162) connect to the network via RSPs. End users can connect their equipment to an IP router on an RSP network such as the case with end user 150 whose networking equipment is connected to IP router 132 installed in RSP 102 network. Another end user, such as end user 162, can be connected to a transport switch such as optical switch 130 installed in the network of RSP 100.

Each UIS (e.g., UIS 120) is an adaptive, intelligent packet services hardware platform, such as the UIS disclosed in U.S. patent application Ser. No. 10/667,869, which is hereby incorporated by reference. The UIS 120 allows RSPs 100, 102, 104, 106 and 116 to securely and privately share hardware resources with each other. The UIS 120 includes a master controller node (MCN) to manage and supervise the provisioning of logical communications nodes (LCNs), each being associated with a different service provider (e.g., RSP or WSP).

Each LCN is the result of two processes, the first being a logical partitioning process resulting in the formation of a real-time operating system (RTOS) virtual machine and applications running on the RTOS. The second process is the low-level hardware partitioning that allocates specific hardware resources, such as processors, traffic managers, memory, hard disk space or portions of a common hardware subsystem such as a switch fabric on an as needed basis to LCNs. The dynamic nature of the switching element reconfiguration allows it to be broken down into a number of smaller switch fabrics, each serving and switching traffic within the LCN. LCNs are separated from one another by a stateful firewall that could be implemented in hardware using ASICs to realize traffic and control filters, or in software as an application and controlled by the RTOS.

The UIS 120 interfaces to other network nodes using electrical or optical network interfaces. The UIS 120 also interfaces to the RSPs (e.g., RSP 106) network through a management interface. The UIS 120 utilizes its real-time features, security and privacy capabilities through LCNs provisioning and management along with network protocols and signaling protocols to realize the inter-provider IP service implementation.

SE 140 is a set of software engines running on a server that perform several functions related to provisioning inter-provider IP services, such as pricing calculations of IP resources, modifying business models and policies for payments, collections and revenue and pricing structure. SE 140 allows the seller and buyer of a resource to be anonymous, hence keeping transactions secure and private when used in conjunction with the UIS. SE 142 provides the same functions as SE 140 and is installed in the network of WSP 112. SE 144 provides same functions as SE 140 and 142 and is installed in the network of RSP 110 and managed by the wholesale division of RSP 110. SE 144 allows RSP 110 to provide wholesale services and real-time pricing for these services and for resources to smaller downstream RSPs, such as RSP 108.

In cases where RSP 108 and RSP 110 are competitors wishing to trade resources and services or share the capabilities of a UIS, such as UIS 124, each of RSP 110 and RSP 108 can operate and install a separate SE, e.g., SE 144 and SE 146 respectively, in their networks, and pricing information and business models could be kept private by configuring the LCN of each RSP to communicate only with the RSP's network nodes and SE.

DB 141, 143 and 145 are databases running on servers in WSP 118, WSP 112 and RSP 110, respectively. These databases contain information about other RSPs and WSPs, services offered and their profile and details, such as business agreements, configuration parameters of their networks and resource inventories. Each database is operated and managed by the WSP or one of the RSPs, and could be running on the associated UIS platform or on a third party server such as a UNIX or other operating system platform. The UIS operated and installed in the WSP's network also stores information regarding network topologies, UIS node resources and node utilization.

OSS 210, 212, 214 and 216 include the functionality of prior art OSS systems currently available in the market place. In addition, OSS 210 interacts with SE 140 running in the WSP 118 network and OSS 212 interacts with SE 142 running in the WSP 112 network. Each OSS (e.g., OSS 210) is connected to other OSSs (e.g., OSS 216) through an electrical or optical packet based IP network. Each OSS further uses policies throughout the IP service provisioning process, and the policies can be predefined statically or developed in real-time.

Figure 2:
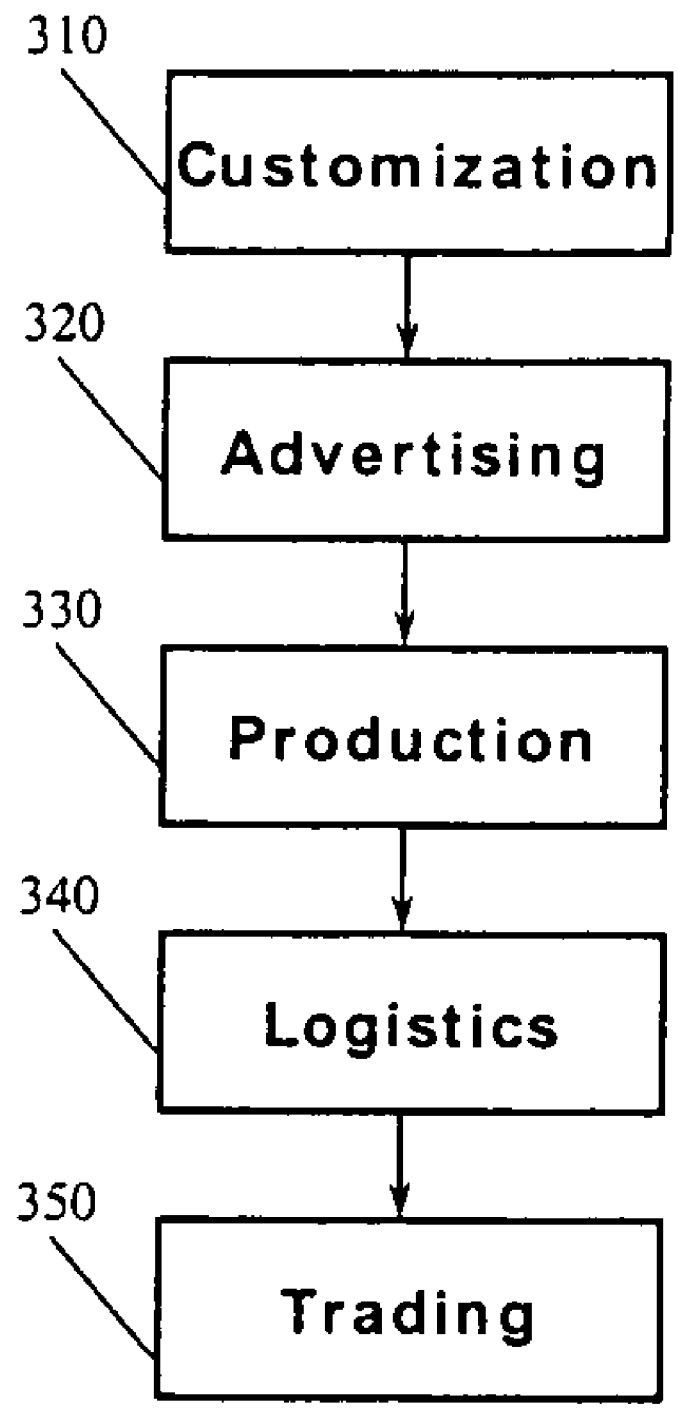
FIG. 2 illustrates exemplary phases of an inter-provider IP service provisioning process, in accordance with embodiments of the present invention.

FIG. 2 illustrates exemplary phases of an inter-provider IP service provisioning process. The phases include customization 310, advertising 320, production 330, logistics 340 and trading 350. The provisioning of inter-provider IP services starts with the customization phase 310. In the customization phase 310, customized services that the subscriber requires from the RSP and the RSP requires from the WSP are defined. End users and subscribers are demanding personalized services. As a result, the RSP must be capable of developing a system where an electronic profile creation for the subscriber is developed, processed and translated into a service provisioning requirement on the RSP's network and other networks, such as the WSP network. Service customization and personalization includes an automated workflow system and a dynamic signaling mechanism between the RSP and WSP to request provisioning. The signaling mechanism can be an in-band network signaling mechanism using protocols such as, but not limited to, SIP, Reservation Protocol (RSVP), Label Distribution Protocol (LDP) and Constraint-Routing LDP (CR-LDP), or out-of-band signaling mechanism between OSS systems using protocols such as XML, SNMP or others. The selection depends on the network design, the IP applications and IP services involved in supporting these applications.

Provisioning takes place based on the available resources in each network. Therefore, in the advertising phase 320, the resource availability is made known to all RSPs and WSPs. Typically, the WSP is the best positioned entity in the network to store and advertise information about network resources and RSP requirements. The WSP can filter information and advertise it in a valuable manner to the RSPs and charge a premium for the information advertised. The WSP can also provide the RSP and WSP resource availability and requirement information to all other RSPs and WSPs without declaring the source of the information, thereby protecting the privacy and security of the RSPs and their customers. The main function of the advertising phase 320 is ensuring that the correct control and informational messages get transmitted to the relevant RSPs and WSPs.

The production phase 330 involves service provisioning, resource allocation and optimization, and service monitoring. The WSP in the production phase 330 provisions a service for a RSP within the cost, quality, time and location constraints. The WSP is not just a bandwidth provider or packet transporter as is the case of prior art methods, but is a more intelligent decision maker in the process of end-to-end provisioning. The WSP conducts intelligent, optimized service provisioning tasks based on information provided to the WSP by the RSP and based on information collected by the WSP itself through its nodes, network topologies, demand and supply of other RSPs and an inventory of all available resources.

The logistics phase 340 involves inventory management and resource and service monitoring. During the logistics phase 340, the goal is to reduce the inventory of available resources by offering the resources at variable prices, depending on their abundance. By maximizing usage of available resources, the service delivery efficiency can be improved. The inventory can be stored, for example, in the databases (DB) 141, 143 and 145 as illustrated in FIG. 1.

The trading phase 350 is the phase where the WSP and RSP agree to a price for the added values each of them contribute to the end-to-end IP service delivery. The trading phase 350 involves a process of turning complex IP services into tradable commodities to generate new financial instruments. With all exchanges, liquidity requires that the product or service being traded be easily compared with offerings from a variety of sellers, in effect treating the service as a commodity. Beyond reducing transaction costs, commoditization also allows the ability to introduce new products, including futures, hedges and other instruments. Applying this to IP services, introducing exchanges could cut the provisioning time from months for an end-to-end multi-provider service to minutes or even seconds with real-time services exchange.

WSPs are strategic players and add a huge value to any end-to-end IP service. Their position in the network allows them to be a broker, market maker, an exchange or all of the three. They can facilitate services between RSPs in the case of a broker, and exchange services, network information and resources in the case of an exchange and leverage their own network in the case of market makers.

Figure 3:
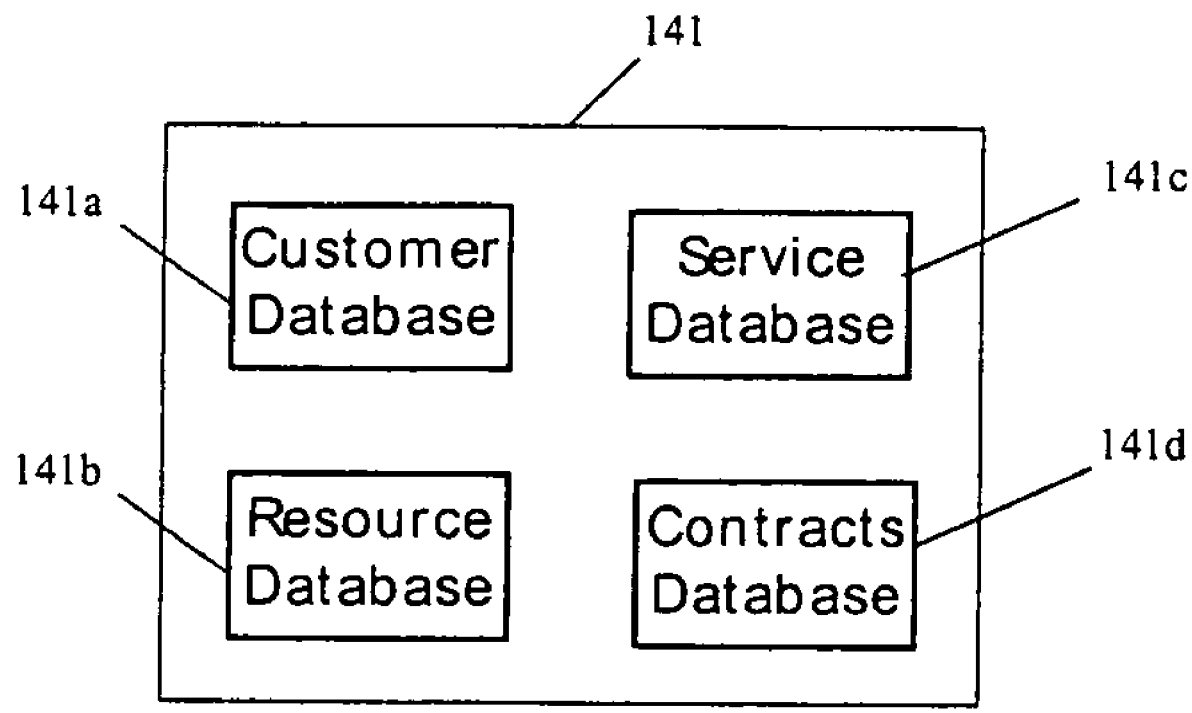
FIG. 3 illustrates an exemplary configuration of databases, in accordance with embodiments of the present invention.

FIG. 3 illustrates a set of databases that host and store real-time information relevant to the provisioning of the inter-provider IP service. Referring to FIG. 3, customer database 141*a* stores information about the WSP customer, which is typically an RSP or another WSP. Information can be stored in multiple tables. Examples of such tables are a customer contact information table storing addresses, phone, email and other contact information of the RSP, a customer configuration table, storing IP addresses that belong to the RSP, domain names, routes to reach the RSP and other forwarding and network configuration information, and a service table, storing the services to which the RSP is subscribed to, a copy of all contracts and agreements between the WSP and the RSP, the details of such contracts, such as the pricing of services to which the RSP is entitled to receive from the WSP, quality terms of the services, provisioning lead times, and other service details and guarantees.

A second type of database is resource database 141*b*. The resource database 141*b* stores information about all resources in the WSP's network. Examples of these resources include, but are not limited to, network resources, such as capacity, virtual links, routes, hardware resources, such as traffic processors, encrypting ASICs, firewalls, switching elements, input/output interfaces and ports, or software resources, such as protocol stacks, sessions and other similar capabilities. This information can also be stored in tables, such as hardware inventory table, software inventory table, network resource inventory table. Another type of table that can be stored in the resource database 141*b* is a master resource table, which stores general information about resource such as the resource name, ID, type, description and application.

The master resource table can be populated by the WSP either manually whenever a new resource type becomes installed in the network and available. Inventory tables are real-time tables that are populated dynamically when information is received from network nodes, such as the UIS in the case of hardware and software resources, the different software engines in the network as in the case of other types of software resources, or from other OSS systems and network protocols and signals such as the case of network resources.

A third type of database is services database 141*c*, which contains information about all services offered by the WSP and the composition of the services. The services database 141*c* also stores and holds information about service costs and expenses incurred in offering a service, and information about the applications of a specific service.

A fourth type of database is contracts database 141*d*, which is a repository of all contracts between the WSP and other WSPs and RSPs. The contracts database 141*d* can also store pre-defined, standardized modules that could be customized to develop a contract between a plurality of providers and populated in the customer database 141*a*. The contracts database 141*d* stores information such as the contract start/end dates, terms, and service details of a customer. In some embodiments of the invention, the contracts database could be a subset or table in the customer database 141*a*. All the databases 141*a-d* are linked to one another.

Figure 4:
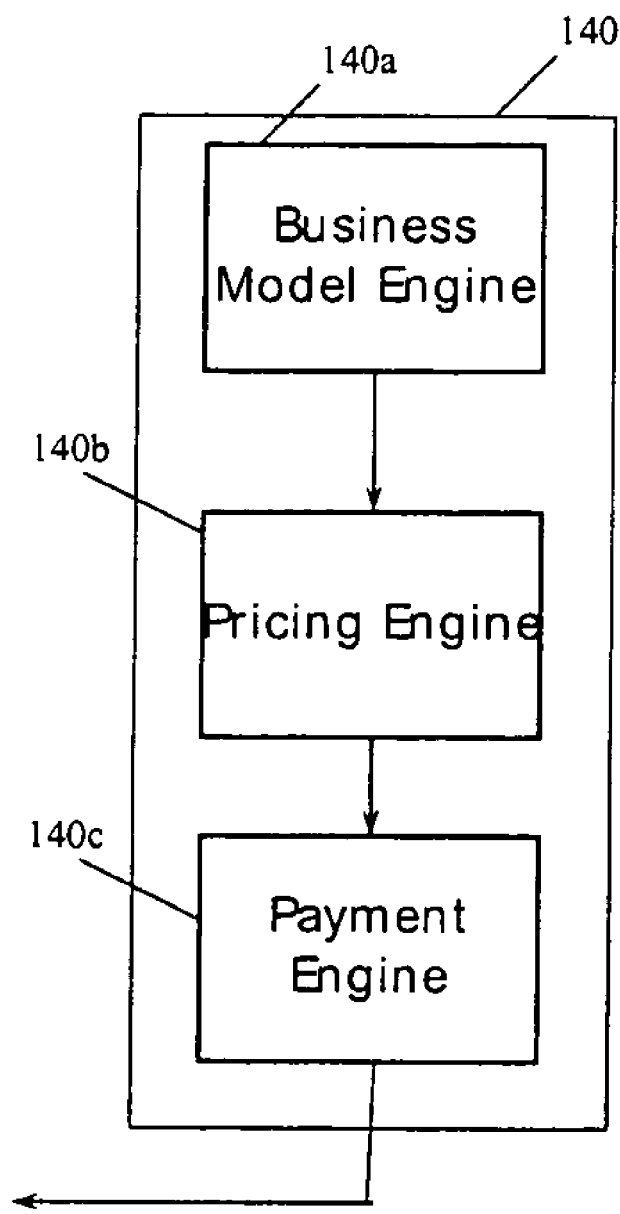
FIG. 4 illustrates examples of software engines, in accordance with embodiments of the present invention.

Referring to FIG. 4, there is illustrated a set of software engines (SE) 140 that operate on standard operating systems such as UNIX or Windows based servers. The SE 140 includes a business model specification engine 140*a*, a pricing calculation engine 140*b*, and a payment definition engine 140*c*, all of which work together to provision an inter-provider IP service in conjunction with the UIS 120 (shown in FIG. 1), DB 141 (shown in FIG. 3) and OSS 210 (shown in FIG. 1 and described in more detail below in connection with FIG. 5).

The business model specification engine 140*a* allows the WSP to input information relating to the cost of resources offered by the WSP to RSPs, the ranges for gross profit that are acceptable for a service offered to an RSP and expenses incurred in a typical service. Business model engine 140*a* can then calculate financial and business ratios and compare these ratios with the business requirements and plans of the WSP. Business model engine 140*a* also provides forecasts simulations for various business scenarios.

Business model engine 140*a* receives input such as business goals and requirements, costs of resources and services to be sold, custom business factors, service and resource information. This information could be retrieved by business model engine 140*a* from other online information repositories and databases, manually or through software applications using any of a plurality of protocols and interfaces. Business model engine 140*a* provides the pricing engine 140*b* with business and forecast information.

Pricing engine 140*b* uses information provided by business model engine 140*a* to calculate prices for the different resources offered by the WSP to the RSP and to calculate prices for IP services the WSP provides the RSP either directly or through other RSPs or WSPs. Examples of types of information received by pricing engine 140*b* from business model engine 140*a* include pricing scenarios under various conditions and permutations, real-time inventory information from service and resource database. Pricing engine 140*b* can calculate prices in real-time for the same entity (service or resource) under different conditions and permutations such as volume requests, in-network/off-network, demand and many other factors. Payment definition engine 140*c* calculates due dates for payments due by the RSP or partners of the WSP for services or resources offered to them. The payment definition engine 140c performs these calculations by retrieving information from the contracts database 141d or customer database 141a (shown in FIG. 3).

Business model engine 140a allows the WSP to optimize the business operations and to provision and offer an IP service to the RSP at the best conditions, price and quality that meets the business needs of the RSP and allows the WSP to maximize productive yield and to realize the maximum profits, through reducing costs and expenses associated with providing a particular service to a particular customer. Business model engine 140a achieves the optimized business decision by recognizing and adapting to changes in market dynamics, such as resource availability, custom business factors, service information, and the WSPs business goals. The business model engine 140a allows the WSP to define the required business metrics and goals such as profit margin, asset turnover, return on assets, short term liquidity, profitability on sales, and other similar ratios. Also, business scenarios can be forecasted. The business model engine 140a receives information from the resource database 141b, (shown in FIG. 3), such as real-time inventory levels and market demand requirements. Other types of information, such as custom business or operational WSP factors, can also be accounted for in any calculations. Business scenarios and forecast information for services and resources is then sent to the pricing engine 140b, which also receives real-time resource inventory information from the resources databases 141b, and real-time service demand information from the services database 141c (shown in FIG. 3).

Pricing engine 140b calculates real-time prices for each possible service component and for the different forecasted and developed scenarios submitted by business model engine 140a. The prices for all the possible cases developed by the business model engine 140a is then sent to payment engine 140c which customizes these developed prices for each WSP customer by accessing the relevant customer information from the respective contracts and the customer databases records. These customized payment templates are then sent to the OSS of the WSP.

Payment engine 140c receives real-time pricing information for services and resources requested by an RSP from a WSP under each possible condition. Payment engine 140c processes the RSP's contract information with the WSP and correlates the results with the input received from pricing engine 140b to determine if prices and service scenarios are within contract. In the case of compliance payment engine 140c send payment terms and conditions to the OSS in the WSP network, to a third party market exchange, or to the RSP directly depending on the business arrangement developed among the WSP, RSP and market exchange if present. In some cases, the WSP could also be the market exchange.

Other SEs are also possible in embodiments of the present invention. For example, a contract generation engine can be implemented in the OSS to define, develop, create and communicate legal and business contracts between the WSP and its customers. Other examples include a policy engine implemented in the OSS that controls the provisioning of services and a financial trading market engine that allows WSPs to trade telecom resources in an open market in real-time.

Figure 5:
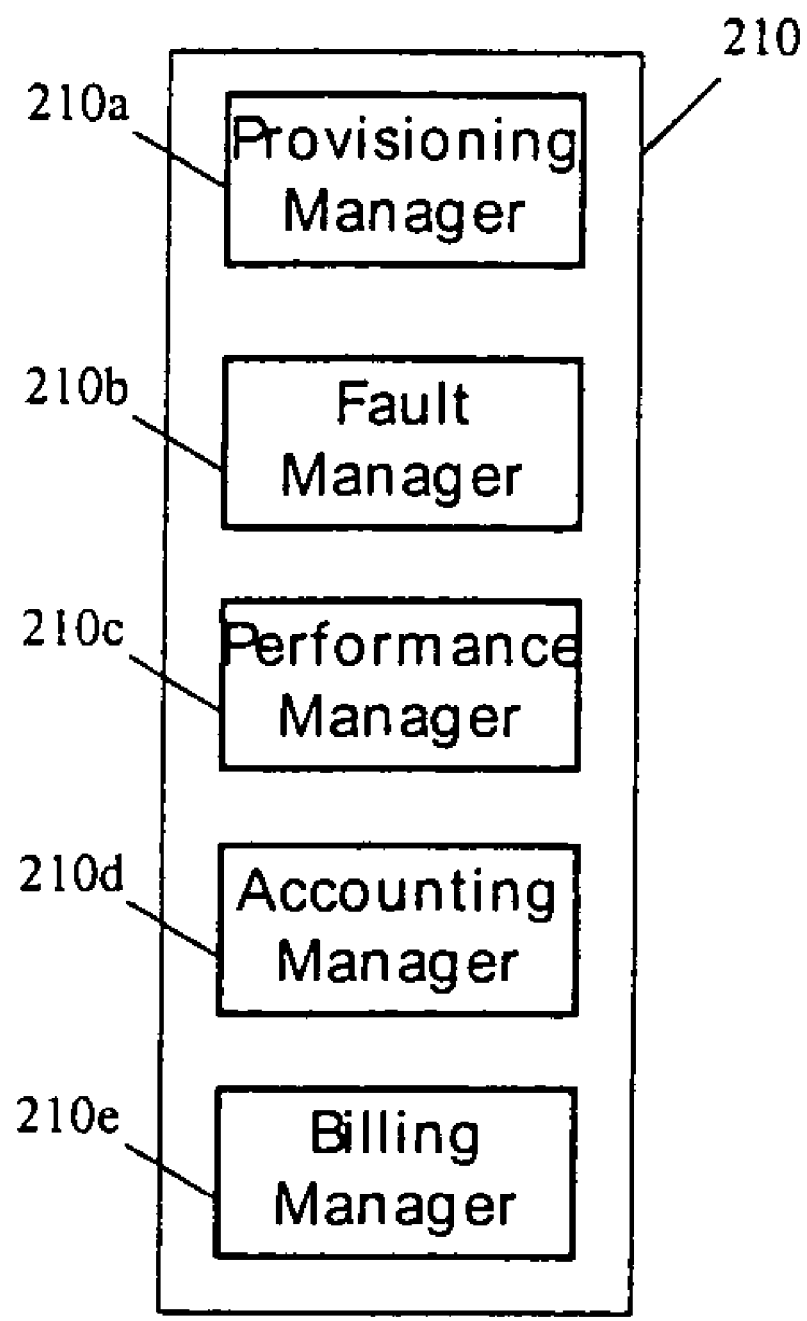
FIG. 5 illustrates exemplary components and functions of the OSS to satisfy the requirements of an inter-provider IP service realization, in accordance with embodiments of the present invention.

Referring to FIG. 5, each Operational Support System (OSS) (e.g., OSS 210 in WSP 118 of FIG. 1) includes several components for provisioning an inter-provider IP service, coordinating with the UIS 120 (shown in FIG. 1), DB 141 (shown in FIG. 3) and SE 140 (shown in FIG. 4). The components include provisioning manager 210a, fault manager 210b, performance manager 210c, accounting manager 210d and billing manager 210e.

Provisioning manager 210a is responsible for creating, fulfilling, policing and terminating a service. It receives input from a variety of sources, such as other OSS systems, a web client, a network element or a network protocol. Upon receiving a request for a service initiation, the provisioning manager 210a queries a number of databases, such as the customer database 141a (shown in FIG. 3), to verify the eligibility of service. Provisioning manager 210a receives input (e.g., an IP service request) from an administrator, UIS, another OSS or network node. Provisioning manager 210a retrieves information from customer database 141a to verify the customer is eligible to receive service. If the customer is eligible to subscribe to the requested service, provisioning manager 210a signals the contracts engine (described above in connection with FIG. 4) to issue a new contract to the customer. Provisioning manager 210a also accesses the resources database 141b (shown in FIG. 3) to verify availability of resources. If resources are unavailable, information is sent back to the requestor with a newly modified contract and the price of modified service based on information available in the services database 141c (shown in FIG. 3).

Provisioning manager 210a can amend a customer's contract in cases where the requested service has not been included or pre-defined in a customer contract and send these proposed changes to the WSP's customer using e-commerce technology. The customer can approve changes and the newly updated contract is then stored in the contracts database 141d (shown in FIG. 3). The provisioning manager 210a develops the proposed changes based on customer requirements received by any of the different means described above. The provisioning manager 210a can also include a policy engine (as described above in connection with FIG. 4) that controls the service creation and fulfillment modules of the provisioning manager. All input received by the provisioning manager 210a passes through the policy engine to control and decide how to process the information received.

Fault manager 210b monitors the software and hardware components of the network. When faults are detected, fault manager 210b sends notification to the provisioning manager 210a which either provisions a new service or terminates the existing faulty service. Accounting manager 210d is also notified by provisioning manager 210a and the information is forwarded to billing manager 210e.

Performance manager 210c monitors the performance of the network connections, hardware nodes and software engines and informs the provisioning manager 210a and 210b if certain quality thresholds have been reached.

Accounting manager 210d receives signaling information from provisioning manager 210a that a specific service for a specific user has started, stopped or paused, in other implementation embodiments of the invention the accounting manager can receive information directly from the performance and fault managers. Accounting stops upon receiving a signal from provisioning manager.

Billing manager 210e receives information from payment engines such as payment engine 140c and from accounting manager 210d and uses both to issue service payment requests.

Figure 6:
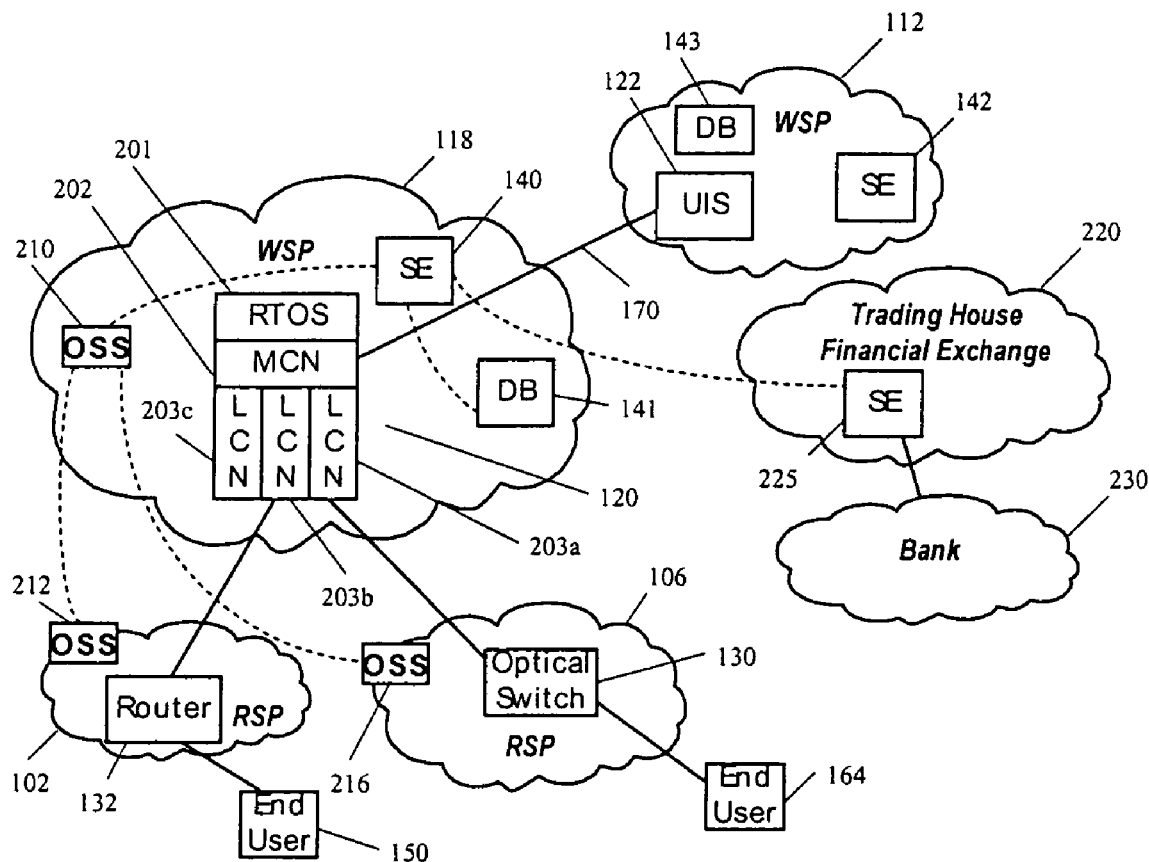
FIG. 6 illustrates an exemplary implementation of embodiments of the present invention.

FIG. 6 illustrates an exemplary implementation of embodiments of the present invention. In FIG. 6, when WSP 118 configures and installs a new UIS 120, the OSS system 216 of RSP 106 sends an electronic request to the OSS system 210 of WSP 118 requesting an LCN with certain specs, cost and availability date. OSS 210 retrieves information from a set of databases and repositories 141 available on the network of WSP 118 and on MCN 202. MCN 202 confirms available resources on UIS 120 and informs OSS 210, using protocols such as extensible Markup Language (XML) or Simple Network Management Protocol (SNMP) or other similar type of protocol.

OSS 210 informs OSS 216 of resource availability status, prices, quality and issues a contract and electronically sends it to OSS 216. MCN 202 provisions an LCN 203a and assigns it to RSP 100. MCN 202 configures firewall to isolate and secure LCN 203a from other existing LCNs (203b-203c). OSS 210 sends instructions to OSS 216 for accessing LCN 203a and provides login information and management port information. RSP 106 connects its new LCN 203a to its network by connecting LCN 203a to optical switch 130. LCN 203a becomes a node on the network of RSP 106 just like any other RSP 106 node, participating in receiving and sending of protocol signals and control information.

After time (t), a customer of RSP 106, such as end user 164, sends a request for additional resources. For example, end user 164 may need to connect a new site (e.g., end user 150) to an existing VPN of end user 164. This new site 150 is not directly connected to RSP 106 but is reachable through RSP 102. In addition, end user 164 may require extra capacity and a certain level of quality. RSP 106 realizes that more resources are required, such as capacity to the WSP and to the remote site where end user 150 is located, in addition to the interconnection of RSP 106 VPN to end user 150, to provision the IP service to end user 164.

RSP 106 sends WSP 118 a request for additional resources using the OSS 216 via OSS 210, or through the use of a network signal. In the case of using a network signal, UIS 120 receives the signal and then sends a request to OSS 210. OSS 210 contacts the business model engine 140a and pricing engine 140c, both located in SE 140, and receives information from UIS 120 and other UISs installed in WSP 118 network about available resources and their capabilities.

DB 141 stores information about the different network nodes, such as UIS 120, and tracks routing tables, links utilization, and other telecom resources utilization in network 118. Using demand information provided by OSS 210 and knowledge of network resources and its availability, DB 141 can maintain a real-time database of resource availability and demand. SE 140 can then calculate real-time prices for resources of WSP 118, and send billing information to OSS 210.

OSS 210 then forwards the billing information to OSS 216 in the form of an electronic contract. OSS 216 either accepts or rejects the offer. If the offer provided by OSS 210 is accepted, OSS 210 informs UIS 120, which then adds the requested additional resources to the existing LCN 203a in real-time dynamically. UIS 120 is also capable of monitoring its own resources and sending availability and utilization information to DB 141 through OSS 210 or directly using a protocol such as XML, SNMP or other similar protocols. This allows WSP 118 to advertise available resources and allows WSP 118 to introduce revenue streams from resources that would have been otherwise idle.

For example, SE 140 can contact SE 225 (a real-time spot market trading engine) to advertise to other wholesale service providers the availability of all resources on WSP 118 network and also possibly resources of RSPs connected to WSP 118. SE 225 also receives similar info from WSP 112 and advertises a bid and an ask price for each resource offered for trade or sale.

As can be seen in FIG. 6, RSP 102 is connected to a different LCN, i.e., LCN 203b, on the same UIS, i.e., UIS 120, to which RSP 106 is connected. However, the requirements of RSP 106 may be different from RSP 102, and hence the configuration may be different. For example, RSP 106 might have a 4 level QoS design in its network, while RSP 102 has a 3 level QoS system, and hence each LCN will support different levels. RSP 106 might require low delay and very low jitter, while RSP 102 does not have strict requirements for delay and jitter. UIS 120 receives these requirements from OSS 210 at the time an LCN is requested or at the time a new IP service offering through an existing LCN is requested. In the example discussed above, the UIS 120 will customize the RTOS 201 and the switching capabilities and low level hardware partitioning of each of LCNs 203a and 203b to allow dynamic customization and low level configuration of each LCN. Components that comprise an LCN could be different in quantity as well as type, function or quality.

MCN 202 hosts software engines and algorithms that translate and exchange network control and configuration information from one LCN to another. Considering one exemplary configuration in which RSP 106 needs to exchange voice traffic on QoS level 1 with RSP 102 on the equivalent QoS level of the network of RSP 102. Recalling that the number of service quality levels are not the same in both networks of RSP 106 and RSP 102, MCN 202 can correlate the values and map the highest QOS level of the network of RSP 100 to the highest QoS level of the network of RSP 102. This is possible by developing profiles for RSPs and storing these profiles in databases and information repositories stored on the UIS or DB 141 regarding the RSPs and their network information.

Considering the case of provisioning a VPN service to connect end user 150 to end user 164, OSS 210 and MCN 202 reviews its business contract and its network configuration agreements it holds with RSP 102. These agreements are stored in DB 141. If WSP 118 has an agreement to terminate services on RSP 102 network, the provisioning manager of OSS 210 will send a notification to UIS 120, which will be received and processed by MCN 202. MCN 202 will in turn signal LCN 203b. LCN 203b will either acknowledge the request and provision the service, or will deny the service and send a denial response to the MCN.

It should be understood that the algorithms realizing the system and method can be implemented as software engines or applications using technologies such as web services and e-commerce protocols, or can be implemented in hardware using ASICs or FPGAs. It should also be understood that these software engines, applications and the databases storing information, such as DB 141 in FIG. 1., could be implemented as part of the UIS or as separate entities as illustrated in FIG. 1.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

I claim:

1. A telecommunications system for provisioning an inter-provider internet protocol (IP) service, comprising:
 a first network managed by a first service provider, said first network having a plurality of resources;
 a second network managed by a second service provider, said second network having a plurality of resources, said second network being operable to receive a request for the inter-provider IP service;
 means for anonymously advertising availability information indicating real-time availability of the plurality of resources of said first network and real-time availability of the plurality of resources of said second network between said first network and said second network;

means for determining additional resources corresponding to a portion of the plurality of resources provided by the first network are needed for the inter-provider IP service based on the request and the availability information;

means for calculating cost information in real-time for use of the additional resources for the inter-provider IP service prior to provisioning the inter-provider IP service, wherein said means for calculating comprises:
a software engine configured to receive the request for the inter-provider IP service, calculate pricing scenarios using the request, obtain real-time resource information including the availability information, calculate real-time prices for each of the pricing scenarios using the real-time resource information and customize the cost information based on knowledge of the identities of the first service provider and the second service provider, the request and the real-time prices;

means for comparing the cost information to cost requirement information associated with the request to determine whether to utilize the additional resources for the inter-provider IP service; and means for automatically provisioning the inter-provider IP service between the first network and the second network using the additional resources.

2. The telecommunications system of claim 1, further comprising:
a unified and integrated switch connected to said first network and said second network, said unified and integrated switch having common resources, a first portion of the common resources being dedicated to the first service provider and being capable of being configured by the first service provider, a second portion of the common resources being dedicated to the second service provider and being capable of being configured by the second service provider.

3. The telecommunications system of claim 2, wherein said unified and integrated switch includes a first logical communications node associated with the first service provider and capable of being dynamically configured in a customized manner by the first service provider and a second logical communications node associated with the second service provider and capable of being dynamically configured in a customized manner by the second service provider.

4. The telecommunications system of claim 2, wherein said unified and integrated switch is within said first network, the first service provider being a wholesale service provider, the second service provider being a retail service provider.

5. The telecommunications system of claim 1, further comprising:
means for creating an electronic contract between the first service provider and the second service provider using the cost information.

6. The telecommunications system of claim 1, further comprising:
a database for storing the real-time resource information.

7. The telecommunications system of claim 6, wherein said means for provisioning includes an operational support system connected to said software engine and said database, said operational support system being further configured to manage the inter-provider IP service in real-time.

8. A method for provisioning an inter-provider internet protocol (IP) service across at least two service providers, comprising:
anonymously advertising availability information indicating real-time availability of resources within respective networks managed by the at least two service providers between the at least two service providers;

receiving a request for the inter-provider IP service at one of the service providers;

determining additional resources corresponding to a portion of the plurality of resources provided by the other one of the service providers are needed for the inter-provider IP service based on request and the real-time availability information;

calculating cost information in real-time for use of the additional resources for the inter-provider IP service prior to provisioning the inter-provider IP service, wherein said calculating comprises:
calculating pricing scenarios using the request;
obtaining real-time resource information including the availability information;
calculating real-time prices for each of the pricing scenarios using the real-time resource information; and
customizing the cost information based on knowledge of the identities of the at least two service providers, the request and the real-time prices;

comparing the cost information to cost requirement information associated with the request to determine whether to utilize the additional resources fro the inter-provider IP service; and automatically provisioning the inter-provider IP service between the respective networks of the at least two service providers using the additional resources.

9. The method of claim 8, further comprising:
providing a unified and integrated switch for the at least two service providers, the unified and integrated switch having common resources;
configuring a first portion of the common resources dedicated to the first service provider of the at least two service providers by the first service provider; and
configuring a second portion of the common resources dedicated to the second service provider of the at least two service providers by the second service provider.

10. The method of claim 9, further comprising:
dynamically configuring in a customized manner a first logical communications node by the first service provider; and
dynamically configuring in a customized manner a second logical communications node by the second service provider.

11. The method of claim 9, wherein the first service provider is a wholesale service provider and the second service provider is a retail service provider.

12. The method of claim 8, further comprising:
creating an electronic contract between the at least two service providers using the cost information.

13. The method of claim 8, further comprising:
collecting the real-time resource information; and
storing the real-time resource information.

14. The method of claim 13, wherein said provisioning further comprising:
managing the inter-provider IP service in real-time.

15. The method of claim 8, wherein said provisioning further comprising:
incorporating network infrastructure and resources in said provisioning;
incorporating business relations among the at least two service providers dynamically and in real-time in said provisioning, wherein the business relations include at least contracts and prices; and incorporating business objectives in said provisioning, wherein the business objectives include at least one of financial ratios, service volume and profitability.

16. The telecommunications system of claim 3, wherein said unified and integrated switch is operable to add a portion of said common resources dedicated to the first logical communications node to the second logical communications node to provision the inter-provider IP service.

17. The telecommunications system of claim 1, wherein said resources include network resources, hardware resources and software resources.

* * * * *